United States Patent [19]

Welker et al.

[11] Patent Number: 5,089,883
[45] Date of Patent: Feb. 18, 1992

[54] COLOR TELEVISION PROJECTION DEVICE WITH CATHODOLUMINESCENT LIGHT SOURCES

[75] Inventors: Thomas Welker, Roetgen; Thomas Zaengel, Aachen, both of Fed. Rep. of Germany

[73] Assignee: U.S. Philips Corporation, New York, N.Y.

[21] Appl. No.: 428,389

[22] Filed: Oct. 27, 1989

[30] Foreign Application Priority Data

Oct. 29, 1988 [DE] Fed. Rep. of Germany ....... 3836955

[51] Int. Cl.$^5$ ............................................. H04N 9/31
[52] U.S. Cl. .................................... 358/60; 358/236
[58] Field of Search ................... 358/236, 60

[56] References Cited

U.S. PATENT DOCUMENTS 4,870,484 9/1989 Sonehara ................... 358/236 X

FOREIGN PATENT DOCUMENTS 275601 7/1988 European Pat. Off. .
2191057 12/1987 United Kingdom .

Primary Examiner—James J. Groody
Assistant Examiner—Mark R. Powell
Attorney, Agent, or Firm—John C. Fox

[57] ABSTRACT

The invention relates to a color television projection device having three planar monochromatic light sources for the background illumination of a viewing screen, in which a matrix-shaped electro-optical light valve is associated with each light source characterized in that the light sources are cathodo luminescent.

4 Claims, 1 Drawing Sheet

COLOR TELEVISION PROJECTION DEVICE WITH CATHODOLUMINESCENT LIGHT SOURCES

BACKGROUND OF THE INVENTION

The invention relates to a colour television projection device having in which the projected image is formed by the controlled transmission of light from three planar monochromatic light sources to a viewing screen using a matrix-shaped electro-optical light valve in front of each light source.

Such a colour television projection device is known from GB-A-2191057 in which the light sources are, for example, luminescent lamps the luminescent materials of which have been chosen to be so that the lamps produce light close to desired colour and in which the light valves are, for example, liquid crystal light valves or electroscopical light valves. The luminescent lamps may be planar and have substantially the same expanse as the light valves associated with them to illuminate the light valves uniformly.

Brightness densities sufficient for colour television projection devices can in principle not be achieved with such luminescent lamps. Moreover, the luminescent materials which may be used in such luminescent lamps do not correspond to the specifications for the colour points of the primary colours red, green and blue and of the white point to be produced therefrom, as they are provided for colour television projection devices (For example, the European "EBU standards for chromaticity tolerance for studio monitors", Tech. 3213-E, Brussels, August, 1975). Therefore, in present day conventional colour television projection devices having liquid crystal light valves, considerable deviations from the primary colour values are tolerated, which lead to considerable colour distortions in the picture display.

A further problem is presented by the necessity to pass the light through the light valves in a narrow aperture angle. Since in optical displays the aperture x, the picture size and the object size, respectively, are all constant, a larger aperture angle of the optical system before the light source that is, a more efficient light collection) can be realized only with point light sources.

An efficient light collection in the narrow useful aperture angle of the light valves has been achieved for color television projection devices employing cathode ray tubes to form the display image, by the combination of the tubes luminescent layer and a multilayer interference filter in front of the layer, as is known already for projection television with cathode ray tubes U.S. Pat. Nos. 4,634,926; 4,647,812; 4,683,398; and U.S. patent application Ser. Nos. 273,731 and 014,566, as well as for arrangements with light sources which emit UV radiation U.S. patent application Ser. No. 134,433.

U.S. Pat. No. 4,336,480 discloses a cathode ray tube which comprises an evacuated envelope, a monochromatic layer of cathodo luminescent material provided on the an inner surface of the envelope, which is capable of emitting selectively red, green or blue radiation, and an electron gun accommodated in the envelope, which is provided opposite to the layer of cathodo luminescent material and which produces an unconcentrated electron beam which radiates substantially the whole layer of cathodo luminescent material so that the same is capable of luminescing simultaneously over the whole surface. Such cathode ray tubes are used as light sources for large picture display systems, for example, display panels in sport stadiums. Such a system is formed from a large multiplicity of groups of red, green and blue cathode ray tubes which are arranged in a matrix from which any picture can be formed.

The picture display system described in U.S. Pat. No. 4,336,480 operates according to the direct vision principle, i.e. the viewer looks directly on the excited layer of cathodo luminescent material. Furthermore, a multiplicity of cathode ray tubes is used as light sources in which each individual light source represents a picture spot. Hence the requirements imposed on the light sources of brightness density, homogeneity of the cathodo luminescence and angle distribution of the cathodo luminescent emission are smaller by orders of magnitude than in colour television projection devices.

OBJECT AND SUMMARY OF THE INVENTION

It is the object of the invention to provide a colour television projection device having electro-optical light valves, with light sources from which monochromatic and extremely high homogeneous luminous densities are produced from a planar surface.

According to the invention this object is achieved in a colour television projection device of the type mentioned in the opening paragraph in which the light sources are cathodo luminescent light sources.

The invention solves the problems of the colour purity and efficiency of the light collection in that planar cathodo-luminescence light sources with suitable primary colours (red, green and blue) are provided directly behind the light valves. The colour specifications of the device are fulfilled by suitable choices of the color luminescent materials.

The light valves preferably are thin film transistor-switched liquid crystal light valves but any electrically controlled light valve which forms a display by varying the transmission of light through it may be used.

The cathodo luminescent light sources each comprise a front substrate bearing a layer of cathodo luminescent material, and preferably a multilayer interference filter under the layer by which the light is coupled efficiently in a narrow aperture angle.

A cooling means such as a flowing liquid is preferably provided between the front substrate and the light valve.

BRIEF DESCRIPTION OF THE DRAWING

In the drawing diagrammatically one embodiment of cathodo luminescent light source with a light valve.

BRIEF DESCRIPTION OF THE PREFERRED EMBODIMENTS

Figure 1:
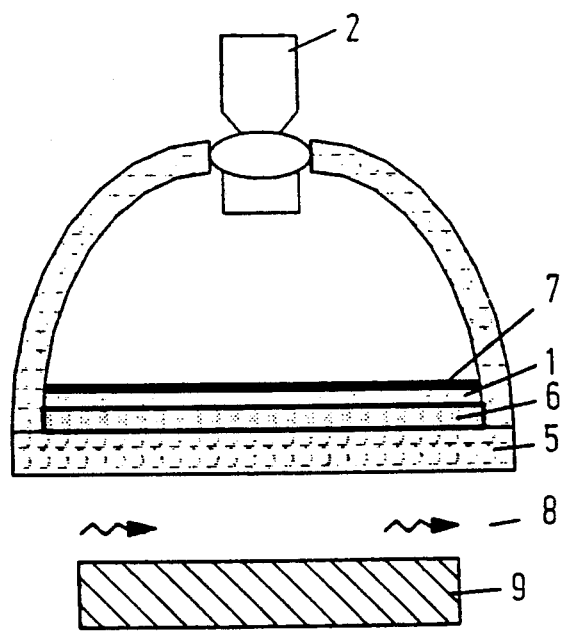
Figure 2:
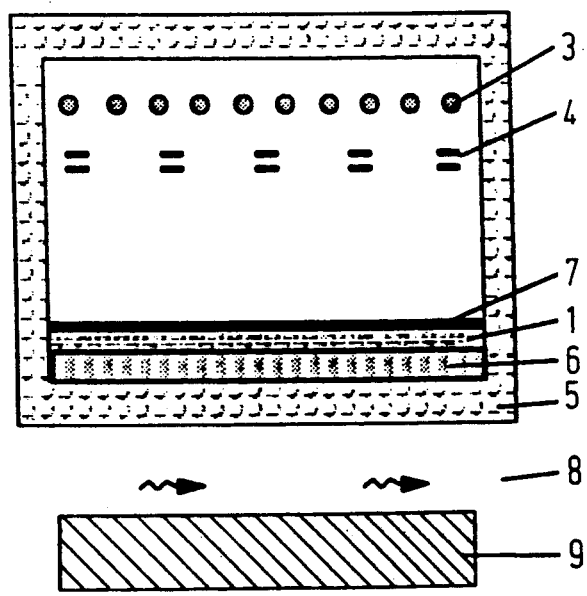
FIG. 2 shows diagrammatically another embodiment of a cathodo luminesent light source with a light valve.

The planar cathodo luminescent light sources as shown in FIGS. 1 and 2 are constructed similarly to cathode ray tubes. However, in operation, the layer of cathodo luminescent material 1 is not scanned by an electron beam, but the whole surface is flooded homogenously with high-energy electrons. As such an electron source either a flood gun 2 (FIG. 1) or thin parallel-arranged wire cathodes 3 (FIG. 2) may serve. In the latter case a grid 4, which serves for the homogenization of the current density over the whole layer of luminescent material, is additionally provided between the cathode 3 and the layer 1 of luminescent material. A multilayer $TiO_2$-$SiO_2$ interference filter 6 may be provided between the cathodo luminescent layer 1 and a transparent front substrate 5, for example, a face plate. Layer 1 of luminscent material is typically (20 μm to 40 μm thickness, depending on the type of luminescent material). In order to prevent the accumulation of electric charges on the screen and to reflect light emitted from the screen outwards, the screen layer 1 of luminescent material is covered with a 200 nm thick film 7 of aluminum. When the light sources are to be operated at high load, cooling of the front substrate 5 is necessary, which can be realized, for example, by a laminarly pumped water flow 8 between front substrate 5 and light valve 9. Such a cooling has the additional advantage that the light valve is also cooled, which sometimes becomes necessary in the case of higher loads.

EXAMPLE 1

Three glass plates, 10 cm$^2$ in area and 2.5 mm in thickness, serving as a transparent front substrate 5 are coated with the luminescent materials $Y_2O_3$: Eu, (Zn, Cd)S" Cu, Al and ZnS: Ag respectively, for the red, green and blue light sources, after which interference filters adapted to the individual emission spectra of the luminescent materials are deposited, after which the substrates are incorporated into cathodoluminescent light sources as shown diagrammatically in FIG. 2. These light sources can be operated at 30 kV acceleration voltage and 2.4 mA overall current in CW mode when water cooling is used. The colour points (x, y) and lumen flux F (the latter measured in a 15° aperture angle) are recorded in the following Table:

|  | X | Y | F (in lm) |
|---|---|---|---|
| Red | 0.649 | 0.346 | 147 |
| Green | 0.297 | 0.649 | 602 |
| Blue | 0.145 | 0.045 | 41 |

When these light sources are used a lumen flux (for white) of 178 lm is achieved, while taking into account the transmission losses in the light valves 9, in dichromic prisms used for colour junction, and in the projection optical system. In this case, the overall electric power for all three light sources together is 160 W.

EXAMPLE 2

The three light sources are constructed identically to example 1 except that the glass face plates are replaced by 18 cm$^2$ quartz glass plates having a thickness of 1 mm. As a result of this an energy load which is more than double that of example 1 is possible. These light sources can be operated in continuous wave at 30 kV accelerating voltage with 5.4 mA. The following lumen fluxes are obtained in an aperture angle of 15°, red 276 lm, green 1123 lm, blue 77 lm.

A lumen flux (for white) at the output screen of 331 lm is achieved with these light sources, the overall electric power being 360 W.

We claim:

1. A colour television projection device having three planar monochromatic light sources, a matrix-shaped electro-optical light valve associated with each light source, and a viewing screen, characterized in that the light sources are cathodo luminescent light sources.

2. A colour television projection device as claimed in claim 1, characterized in that the light valves are thin film transistor-switched liquid crystal light valves.

3. A colour television projection device as claimed in claim 1, characterized in that the cathodo luminescent light sources each comprise a front substrate, a layer of cathodo luminescent material on the substrate, and a multilayer interference filter (6) between the substrate and the layer.

4. A colour television projection device as claimed in claim 3, characterized in that cooling means is provided between the front substrate and the light valve.

* * * * *